(12) United States Patent (10) Patent No.: US 8,695,563 B2
Sugiyama et al. (45) Date of Patent: Apr. 15, 2014

(54) LUBRICATION SYSTEM FOR FOUR-STROKE ENGINE

(75) Inventors: Masaki Sugiyama, Numazu (JP);
Toshihiro Tomita, Numazu (JP);
Masaki Kurimoto, Numazu (JP);
Hiroshi Kubota, Numazu (JP)

(73) Assignee: Makita Corporation, Anjo-shi (JP)

( * ) Notice: Subject to any disclaimer, the term of this patent is extended or adjusted under 35 U.S.C. 154(b) by 187 days.

(21) Appl. No.: 12/876,678

(22) Filed: Sep. 7, 2010

(65) Prior Publication Data

US 2011/0067669 A1 Mar. 24, 2011

(30) Foreign Application Priority Data

Sep. 24, 2009 (JP) ................................. 2009-219043
Sep. 30, 2009 (JP) ................................. 2009-227135

(51) Int. Cl.
*F01M 3/04* (2006.01)
*F01M 1/04* (2006.01)
*F01M 9/10* (2006.01)

(52) U.S. Cl.
CPC . *F01M 1/04* (2013.01); *F01M 9/10* (2013.01); *F01M 3/04* (2013.01)
USPC ............. 123/196 M; 123/196 CP; 123/196 R

(58) Field of Classification Search
CPC ........... F01M 11/02; F01M 1/02; F01M 1/04; F01M 1/16; F01M 3/04; F01M 9/10; F01M 13/04; F01M 13/022; F01M 2013/0438; F02B 2075/027; F02B 2075/025; F02M 25/06
USPC ...................... 123/196 R, 572–574
See application file for complete search history.

(56) References Cited

U.S. PATENT DOCUMENTS 5,582,145 A * 12/1996 Aizawa et al. .......... 123/196 CP
5,957,118 A * 9/1999 Tateno et al. ................. 123/573

(Continued)

FOREIGN PATENT DOCUMENTS

EP 0 779 412 A2 6/1997
JP H10-089041 4/1998

(Continued)

OTHER PUBLICATIONS

Extended European Search Report issued in European Patent Application No. 10178602.8 on Feb. 3, 2011.

(Continued)

*Primary Examiner* — Lindsay Low
*Assistant Examiner* — Syed O Hasan
(74) *Attorney, Agent, or Firm* — Oliff PLC

(57) ABSTRACT

A lubrication system for a four cycle engine that lubricates the valve mechanism with the oil mist of the concentration, lowered by the liquefying means. The lubrication system has an oil feeding passage for connecting an oil reservoir with the crank chamber and sending the oil retained in liquid form in the oil reservoir to the crank chamber under a negative pressure of the crank chamber, a communication passage for connecting the crank chamber with the oil reservoir and sending oil mist generated in the crank chamber to the oil reservoir when under a positive pressure of the crank chamber, liquefying means in the oil reservoir for liquefying the oil mist sent from the communication passage to the oil reservoir to decrease the concentration of the oil mist, and a supply passage for supplying the oil mist from the oil reservoir to the valve operating chamber through the liquefying means.

10 Claims, 6 Drawing Sheets

(56) References Cited

U.S. PATENT DOCUMENTS

| | | | | |
|---|---|---|---|---|
| 5,960,764 | A * | 10/1999 | Araki | 123/196 R |
| 5,975,042 | A * | 11/1999 | Aizawa et al. | 123/196 M |
| 6,213,079 | B1 * | 4/2001 | Watanabe | 123/196 R |
| 7,121,250 | B2 * | 10/2006 | Yokoyama | 123/196 R |
| 2006/0060174 | A1 * | 3/2006 | Ashida | 123/572 |
| 2007/0028887 | A1 | 2/2007 | Kurihara | |
| 2007/0240692 | A1 * | 10/2007 | Takahashi et al. | 123/572 |
| 2008/0047519 | A1 * | 2/2008 | Naito et al. | 123/193.5 |
| 2009/0013959 | A1 | 1/2009 | Lin | |
| 2009/0014246 | A1 | 1/2009 | Lin | |

FOREIGN PATENT DOCUMENTS

| | | |
|---|---|---|
| JP | H11-013444 | 1/1999 |
| JP | B2-3209486 | 7/2001 |
| JP | A-2002-147213 | 5/2002 |
| JP | 2003-276321 | 9/2002 |
| JP | A-2002-276321 | 9/2002 |
| JP | 2004-251231 | 9/2004 |
| JP | A-2007-263069 | 10/2007 |
| TW | 200905065 | 2/2009 |

OTHER PUBLICATIONS

May 4, 2012 Notice of Reason for Rejection issued in Chinese Patent Application No. CN 201010287727.4 (with translation).

Japanese Office Action issued in Application No. 2009-219043 dated Feb. 25, 2013 (w/ English Translation).

Notice of Reason for Rejection, dispatched Mar. 26, 2013 in counterpart Japanese Patent Application No. 2009-227135 (with English translation).

Aug. 13, 2013 Office Action issued in Japanese Application No. 2009-227135 (w/ English Translation).

* cited by examiner

LUBRICATION SYSTEM FOR FOUR-STROKE ENGINE

FIELD OF THE INVENTION

The present invention relates to a lubrication system for a four-stroke engine. More particularly, the invention relates to a lubrication system for a four-stroke engine in which no reduction in lubrication performance occurs even when the attitude of the engine is changed variously during use, and to a lubrication system for a four-stroke engine that can circulate oil for lubricating the engine even when the attitude of the engine is changed variously during use.

BACKGROUND OF THE INVENTION

Two-stroke engines are conventionally used as the driving engines of portable power tools, such as portable trimmers for trees and plants and backpack power tools, carried by the operators themselves or on the backs of the operators. However, for example, as awareness of environmental issues grows and emission regulations become more stringent, there is an increasing need for replacement of two-stroke engines used as driving sources with four-stroke engines.

However, the numbers of required components of four-stroke engines are greater than those of two-stroke engines, and therefore the weights of the four-stroke engines tend to be greater than those of the two-stroke engines. A portable power tool, in particular, is used on the premise that the operator carries the tool during operation, and therefore there is a demand for a weight reduction of the engine.

A four-stroke engine provided with a lubrication system is developed (see Patent Document 1). In this lubrication system, a pump for lubrication is not separately provided, and pressure changes in a crank chamber are utilized to circulate oil. This lubrication system includes a check valve disposed in the bottom portion of the crank chamber. This check valve opens when a positive pressure is created in the crank chamber, and oil or oil mist in the crank chamber is delivered to an oil reservoir. The oil or oil mist passes through a communication tube provided in the oil reservoir and is supplied to a valve-operating chamber and a valve-operating unit for driving the valves, and a sufficient amount of oil is thereby supplied to the valve-operating chamber and the valve-operating unit. A communication hole is provided in the crank chamber so as to communicate the crank chamber with the valve-operating chamber when a piston moves upward. The oil accumulated in the valve-operating chamber is returned to the crank chamber through the communication hole when the communication hole opens.

If blow-by gas enters a lubrication path for the lubricating oil, the concentration of the blow-by gas in the lubrication path increases. In this state, if the blow-by gas remains mixed with the oil, the oil is gradually degraded, and this adversely affects the lubrication of driving components. Therefore, measures are generally taken to discharge the blow-by gas in the lubrication path into a combustion chamber to prevent early deterioration of the oil. A structure for allowing the valve-operating chamber and the combustion chamber to communicate with each other through an air cleaner is often used, as also described in Patent Document 1.

Patent Document 2 proposes a lubrication system for a four-stroke engine. In this lubrication system, a pump for lubrication is not separately provided, and pressure changes in a crank chamber are utilized to circulate oil. In this lubrication system, a negative pressure created in the crank chamber is utilized to supply oil mist generated in an oil tank to the crank chamber through a first oil passage that is drilled in a crankshaft and communicates the oil tank with the crank chamber, and the crankshaft and components therearound are thereby lubricated. The floating oil mist generated in the oil tank is delivered, by utilizing a positive pressure created in the crank chamber, to a power transmission mechanism (including an intake valve and an exhaust valve) in a first valve-operating chamber and a cam mechanism in a second valve-operating chamber, which are disposed above the oil tank when the engine is upright, and these driving components are thereby lubricated.

A partition plate is disposed inside a head cover that forms the second valve-operating chamber. The partition plate partitions the space inside the head cover into an upper section serving as a breather chamber and a lower section serving as the second valve-operating chamber. The breather chamber is in communication with the second valve-operating chamber through a communication part that is opened in the second valve-operating chamber. A box-shaped partition member is welded to the partition plate, and an oil collection chamber is formed between the partition plate and the partition member. Suction tubes extending toward the power transmission mechanism in the second valve-operating chamber are provided in the partition plate, and suction tubes extending toward the ceiling surface of the head cover are provided in the partition member. A conduit tube that is in communication with the oil collection chamber and protrudes toward the second valve-operating chamber is provided in the partition plate. The conduit tube is in communication with the crank chamber.

In this lubrication system, when a negative pressure is created in the crank chamber as the crankshaft rotates to move a piston, a negative pressure is also formed in the oil collection chamber through the conduit tube. Therefore, the oil accumulated in the second valve-operating chamber or the breather chamber is sucked through the suction tubes and is returned to the crank chamber.

PRIOR ART DOCUMENT

Patent Document

[Patent Document 1] Japanese Patent No. 3209486 (see paragraphs [0012] to [0027], FIG. 2)

[Patent Document 2] Japanese Patent Application Laid-Open No. 2002-147213 (see paragraphs [0041] to [0051], FIGS. 5 and 10)

Generally, oil at a high concentration is required to be present around the crankshaft. However, the valve-operating unit does not require the oil at such a high concentration as that around the crankshaft.

In the conventional lubrication systems, changes in pressure inside the crank chamber are utilized to deliver the oil and oil mist in the crank chamber to the valve-operating chamber and the valve-operating unit without adjustment of the concentration of the oil or oil mist. Therefore, an excessive amount of oil or oil mist is delivered to the valve-operating chamber to lubricate the valve-operating unit, and an excessively large amount of oil stays in the valve-operating chamber. This causes the problem in that a large amount of oil is discharged into the combustion chamber together with blow-by gas and the oil is promptly consumed. Therefore, the replenishment cycle of oil becomes short, and lubrication failure can occur unless the oil is replenished without fail. If the amount of oil discharged into the combustion chamber further increases, a large amount of unburned oil is discharged from a muffler to the outside, and this may adversely affects the environment.

Moreover, in the conventional lubrication systems, since the oil mist generated in the oil tank is supplied to the crank chamber and the valve-operating chamber, the concentration of the oil mist supplied to the valve-operating unit is substantially the same as the concentration of the oil mist supplied to the crank chamber. Therefore, the crankshaft and the components therearound are not sufficiently lubricated unless a sufficient amount of oil mist is generated or the generated oil mist is sufficiently supplied. If an excessively large amount of oil mist is delivered to the valve-operating chamber, the amount of oil accumulated in the valve-operating chamber becomes too large. This causes the problem in that a large amount of oil is discharged into the combustion chamber together with blow-by gas and the oil is promptly consumed.

SUMMARY OF THE INVENTION

The present invention has been made in view of the above circumstances, and it is an object of the invention to provide a lubrication system for a four-stroke engine that can lubricate a crank chamber and other driving systems with oil at suitable concentrations to prevent an increase in oil consumption.

It is another object of the invention to provide a lubrication system for a four-stroke engine which can prevent lubrication failure from occurring around a crankshaft and can also reliably prevent the accumulation of oil in the valve-operating chamber from occurring.

To solve the foregoing problems, a first aspect of the present invention provides a lubrication system for a four-stroke engine. The lubrication system is configured to lubricate components in a crank chamber and in a valve-operating chamber with oil by supplying the oil by utilizing changes in pressure inside the crank chamber caused by reciprocating movement of a piston while circulating the oil, the oil being stored in an oil reservoir provided separately from the crank chamber, the valve-operating chamber accommodating intake and exhaust valve mechanisms therein. In addition, the lubrication system is configured to discharge blow-by gas in an oil circulation path from the valve-operating chamber to a combustion chamber. The lubrication system includes: an oil feed passage that, when a negative pressure is created in the crank chamber, communicates the oil reservoir with the crank chamber to deliver the oil stored in a liquid form in the oil reservoir to the crank chamber; a communication passage that, when a positive pressure is created in the crank chamber, communicates the crank chamber with the oil reservoir to deliver oil mist generated in the crank chamber to the oil reservoir; liquefying means provided in the oil reservoir, for liquefying the oil mist delivered from the communication passage to the oil reservoir to reduce a concentration of the oil mist; and a supply passage for supplying the oil mist from the oil reservoir to the valve-operating chamber through the liquefying means.

In this lubrication system for a four-stroke engine, the oil stored in a liquid form in the oil reservoir is delivered to the crank chamber through the oil feed passage only when a negative pressure is created in the crank chamber. Therefore, in the lubrication system, the oil is prevented from flowing back from the crank chamber to the oil reservoir through the oil feed passage. The oil delivered to the crank chamber sufficiently lubricates the crankshaft and components therearound and is scattered by a counterweight rotating in the crank chamber at a high speed, a connecting rod connected to the counterweight, and other components to form fine oil particles as oil mist. Part of the oil mist generated in the crank chamber adheres to the wall surfaces of the crank chamber and is re-liquefied. Since a relatively large amount of oil still in the liquid form can be delivered to the crank chamber, the driving components in the crank chamber can be sufficiently lubricated.

The oil mist generated in the crank chamber is delivered to the oil reservoir through the communication passage only when a positive pressure is created in the crank chamber. During this process, the oil is also delivered to the oil reservoir together with the oil mist. Most of the oil mist delivered through the communication passage is liquefied into oil by the liquefying means provided in the oil reservoir. The oil liquefied in the oil reservoir, together with the oil delivered through the communication passage, is again stored in the oil reservoir. As described above, the oil is prevented from flowing back from the crank chamber to the oil reservoir through the oil feed passage. Therefore, the backflow does not generate oil mist. The present invention is based on the premise that means for generating oil mist is constituted only by driving components in the crank chamber and that no means for generating oil mist is provided in the oil reservoir. Since the oil mist is delivered from the crank chamber to the oil reservoir through the liquefying means as described above, the concentration of the oil mist can be reduced. Then only the oil mist reduced in concentration by the liquefying means is supplied to the valve-operating chamber to lubricate the valve mechanisms accommodated in the valve-operating chamber.

In a second aspect of the present invention, one embodiment of the liquefying means is configured such that the communication passage and the supply passage have respective opening ends opened at substantially a center of the oil reservoir and protrude into the oil reservoir, that the opening end of the communication passage protrudes further than the opening end of the supply passage, and that the opening end of the communication passage and the opening end of the supply passage are disposed such that the respective opening ends of the communication passage and the supply passage never stay below a surface of the oil even when the oil reservoir with a rated amount or less of the oil stored therein is tilted and a position of the surface of the oil is thereby changed.

In the above configuration, what the opening end of the communication passage protrudes into the oil reservoir further than the opening end of the supply passage means that the supply passage and the communication passage have respective base portions and extend toward their opening ends, and the supply passage extends toward its opening end such that the opening end of the supply passage and an end portion thereof in the vicinity of the opening end are located on the base portion side of the communication passage with respect to a plane that is located at the opening end of the communication passage and orthogonal to the extending direction of the communication passage. A detailed description will be given later with reference to FIG. 4. The extending directions of the supply passage and the communication passage toward the respective opening ends may be parallel to each other, or the supply passage and the communication passage may be disposed such that the respective opening ends are spaced apart from each other toward the respective opening ends.

Generally, a rated amount of oil is stored in the oil reservoir during use. When the amount of stored oil is less than a rated lower limit, a sufficient amount of oil necessary to appropriately lubricate the engine cannot be circulated. When the amount of stored oil exceeds a rated upper limit, the opening ends of the supply passage and the communication passage can stay below the oil surface, and therefore oil mist necessary to appropriately lubricate the engine cannot be well circulated. When the amount of stored oil is within a rated appropriate range, the oil is gradually consumed during use of the engine, and the amount of oil decreases and becomes less than the rated lower limit unless the oil is replenished. The rated amount or less of stored oil means that the amount of stored oil is equal to or less than the rated upper limit and includes the state where the amount of stored oil is less than the rated lower limit.

The state where the position of the oil surface is changed with the oil reservoir tilted means that the relative positional relationship between the oil reservoir and the oil surface that lies horizontally is changed when the oil reservoir is tilted by, for example, tilting the engine. This state includes the state where the oil reservoir is shaken under normal use conditions and the oil surface is thereby undulated. However, the state where the oil reservoir is intentionally shaken hard to cause the oil surface to be highly undulated is not included. In the second aspect of the present invention, the liquefying means described in the first aspect, which is a superordinate concept, is complementally described.

In this liquefying means, even when the oil reservoir is tilted and the position of the oil surface is thereby changed, the communication passage never stays below the oil surface, and accordingly, the air delivered from the crank chamber together with oil mist is not ejected below the oil surface. Therefore, the stored oil is prevented from being blown up together with air blown into the oil, and the generation of oil mist by the air can be prevented. The oil mist ejected from the communication passage collides with the oil surface and the walls of the oil reservoir and is then liquefied. In the liquefying means in the second aspect, the opening ends of the communication passage and the supply passage in the oil reservoir are opened at substantially the center of the oil reservoir. However, in the liquefying means in the first aspect, which is the superordinate concept, the opening ends of the communication passage and the supply passage are not limited to be opened at substantially the center of the oil reservoir. Since the opening end of the communication passage protrudes further than the opening end of the supply passage, the oil and oil mist ejected from the opening end of the communication passage are not directly supplied to the supply passage, and accordingly, oil mist reduced in concentration by liquefaction can be supplied to the supply passage. The protruding length of the communication passage to the opening end thereof with respect to the opening end of the supply passage is a design issue. However, by adjusting the protruding length, the oil mist at a more appropriate concentration can be supplied to the supply passage.

In a third aspect of the present invention, one embodiment of the liquefying means is disposed around the opening end of the communication passage and includes: a collision part with which the oil mist delivered from the communication passage is allowed to collide to facilitate liquefaction of the oil mist; and a discharge part for discharging the oil and oil mist.

The liquefying means including the collision part and the discharge part allows the oil mist to collide with the collision part and then be liquefied, so that the concentration of the oil mist is reduced. The oil flows on the collision part, is discharged from the discharge part, and then returned to the oil stored in the oil reservoir. The oil mist reduced in concentration is also discharged from the discharge part, and this oil mist is supplied to the supply passage. More specifically, the liquefying means may be obtained by surrounding the opening end of the communication passage with a plurality of plate-shaped members with gaps between the adjacent plate-shaped members or by surrounding the communication passage with a punched metal plate formed in a closed-end tubular shape and having a plurality of holes, or the like member. In the third aspect of the present invention, the liquefying means described in the first aspect, which is a superordinate concept, is complementally described.

Since this liquefying means is provided around the opening end of the communication passage, the concentration of the oil mist ejected from the opening end can be more reliably reduced. In this configuration, the oil mist reduced in concentration by means of the liquefying means can be supplied to the supply passage. When the collision part is formed from a plurality of plate-shaped members and the discharge part is formed as gaps between the adjacent plate-shaped members, the size of the gaps is a design issue. However, by adjusting the size of the gaps, the oil mist at a more appropriate concentration can be supplied to the supply passage.

In a fourth aspect of the present invention, one embodiment of the liquefying means is configured such that the communication passage and the supply passage have respective opening ends opened at substantially a center of the oil reservoir, that the opening end of the communication passage and the opening end of the supply passage are disposed such that the respective opening ends of the communication passage and the supply passage never stay below a surface of the oil even when the oil reservoir with a rated amount or less of the oil stored therein is tilted and a position of the surface of the oil is thereby changed, and that a flow blocking unit for preventing the oil and oil mist delivered from the communication passage from directly flowing into the supply passage is disposed between the opening end of the communication passage and the opening end of the supply passage.

In the fourth aspect of the present invention, the liquefying means described in the first aspect, which is a superordinate concept, is complementally described. In this liquefying means, even when the oil reservoir is tilted and the position of the oil surface is thereby changed, the communication passage never stays below the oil surface, and the air delivered from the crank chamber together with oil mist is not ejected below the oil surface. Therefore, the stored oil is prevented from being blown up together with air blown into the oil, and the generation of oil mist by the air can be prevented. The oil mist ejected from the communication passage collides with the oil surface and the walls of the oil reservoir and is then liquefied. In the liquefying means in the fourth aspect, the communication passage and the supply passage each are opened at substantially the center of the oil reservoir. The liquefying means in the first aspect is not limited to be opened at substantially the center of the oil reservoir. In the forth aspect of the present invention, it is clearly described that the flow blocking unit is disposed between the opening end of the communication passage and the opening end of the supply passage. Since the flow blocking unit prevents the oil and oil mist ejected from the opening end of the communication passage from being directly supplied to the supply passage, oil mist reduced in concentration through liquefaction can be supplied to the supply passage.

More specifically, the flow blocking unit is obtained by providing a partition plate between the opening ends of the supply passage and the communication passage. The partition plate may be disposed so as to partition the oil reservoir into two sections, and the opening ends of the supply passage and the communication passage may be disposed in respective sections. In this case, a communication hole for allowing the oil mist to pass therethrough must be provided in the partition plate between the two sections. By providing the partition plate so as to partition the oil reservoir into two sections, the oil surface resists undulating even when the oil reservoir is shaken. The manner of providing the communication hole in the partition plate is a design issue. In consideration of such a design issue, the oil mist at a more appropriate concentration can be supplied to the supply passage.

In a fifth aspect of the present invention, a return passage is provided which is used to return the oil mist liquefied in the supply passage to the crank chamber. In addition, a valve-driving chamber for accommodating driving components of the valve mechanisms (for example, a valve-driving gear 10a and a cam gear 10b in one embodiment) is provided in the supply passage. One of opening ends of the return passage is disposed in a bottom portion of the valve-driving chamber on the oil reservoir side. Since the valve-driving chamber must accommodate the driving components, the chamber must have a certain size. However, since the supply passage functions as the circulation path for oil mist, the size of the supply passage is not required to be as wide as the valve-driving chamber. The valve-driving chamber is formed midway in the supply passage and is wider than the supply passage in communication with the valve-driving chamber. The bottom portion of the valve-driving chamber is a step portion formed at a connection portion between a part of the supply passage and the valve-driving chamber.

When the oil mist supplied to the supply passage lubricates the driving components of the valve mechanisms, the oil mist adheres to these driving components of the valve mechanisms and is then liquefied. The liquefied oil is returned to the crank chamber through the return passage, and therefore oil mist further reduced in concentration is supplied to the valve-operating chamber. Even when the oil is not sufficiently returned to the crank chamber through the return passage, since the driving components of the valve mechanisms are provided midway in the supply passage, which function as resistances, the flow of oil into the valve-operating chamber can be suppressed. Even when the oil mist at a concentration higher than necessary is supplied from the oil reservoir to the supply passage, since one of the opening ends of the return passage is provided in the bottom portion of the valve-driving chamber on the oil reservoir side, the oil can be accumulated in the bottom portion before the oil reaches the driving components of the valve mechanisms. Then, the accumulated oil is returned to the crank chamber. The shapes of the supply passage and the return passage are design issues. In consideration of these design issues, the oil mist at a more appropriate concentration can be supplied to the valve-operating chamber.

In a sixth aspect of the present invention, the lubrication system further includes a direct passage that communicates the valve-operating chamber with the crank chamber when a negative pressure is created in the crank chamber. The direct passage directly connects the valve-operating chamber to the crank chamber.

In the present invention, the oil is circulated by utilizing changes in pressure inside the crank chamber caused by the reciprocating movement of the piston. The valve-operating chamber and the crank chamber that plays a role of a pressure source for oil circulation are connected through the direct passage and communicate with each other when a negative pressure is created in the crank chamber. Therefore, even when the oil mist is liquefied in the valve-operating chamber and a large amount of the liquefied oil stays therein, the oil can be instantaneously delivered to the crank chamber by the strong negative pressure, so that the accumulation of the oil in the valve-operating chamber can be prevented.

In a seventh aspect of the present invention, the direct passage has an opening end that is opened in the crank chamber, the opening end being disposed at a position so as to establish communication with the crank chamber when the piston moves from a position near a top dead center toward the top dead center. More specifically, the opening end that is opened in the crank chamber is disposed such that a negative pressure is created in the crank chamber when the opening end starts opening as the piston moves. When the piston reaches the top dead center, the opening end is already in a fully open state.

To suck oil in a liquid form, a strong negative pressure must be created. In the present invention, the communication between the valve-operating chamber and the crank chamber is established when the negative pressure inside the crank chamber becomes strongest. Therefore, even when a large amount of oil is formed by liquefaction of oil mist in the valve-operating chamber and accumulated therein, the accumulated oil can be delivered from the valve-operating chamber to the crank chamber in a more efficient manner. If the direct passage starts opening when the negative pressure created during pressure change inside the crank chamber is still weak, the amount of intake air delivered to the crank chamber is too large, and a negative pressure strong enough to suck the oil may not be obtained. In the present invention, the position where the direct passage starts opening is adjusted in the design process, so that a negative pressure suitable for efficiently sucking oil can be obtained. In the present invention, the direct passage is kept opened even when the piston moves from the top dead center toward the position near the top dead center. Therefore, when a positive pressure is created in the crank chamber, the oil and oil mist are assumed to flow back from the crank chamber to the valve-operating chamber. In such a case, a one-way valve for restricting the flow of oil and oil mist from the crank chamber to the valve-operating chamber may be provided in the direct passage to prevent the backflow.

To solve the foregoing problems, an eighth aspect of the present invention provides a lubrication system for a four-stroke engine. The lubrication system is configured to lubricate components in a crank chamber and in a valve-operating chamber with oil (for example, lubricating oil A in one embodiment) by supplying the oil by utilizing changes in pressure inside the crank chamber caused by reciprocating movement of a piston while circulating the oil, the oil being stored in an oil reservoir provided separately from the crank chamber, the valve-operating chamber accommodating intake and exhaust valve mechanisms therein. In addition, the lubrication system is configured to discharge blow-by gas in an oil circulation path from the valve-operating chamber to a combustion chamber. The lubrication system includes: an oil feed passage including a suction part, the suction part being positioned so as to stay below a surface of the oil even when the oil reservoir is tilted with the oil stored therein in an amount within a rated range and a position of the surface of the oil is thereby changed, the oil feed passage being configured such that, when a negative pressure is created in the crank chamber, the oil reservoir and the crank chamber are in communication with each other through the oil feed passage so that the oil in the oil reservoir is sucked through the suction part and is delivered to the crank chamber, the oil feed passage having an opening end that is opened in the crank chamber, the opening end being positioned so as to establish communication with the crank chamber when the piston moves from a position near a top dead center toward the top dead center; and a direct passage (for example, a direct passage 147, a connection passage 145, and suction tubes 146 in one embodiment) having a plurality of openings that are spaced apart from each other, are opened in the valve-operating chamber at one ends and are opened in the crank chamber at the other ends, so as to communicate the valve-operating chamber with the crank chamber when a negative pressure is created in the crank chamber, the opening end of the direct passage that is opened in the crank chamber being positioned so as to establish communication with the crank chamber when the piston moves from a position near the top dead center toward the top dead center. In this configuration, the oil in the valve-operating chamber is delivered to the crank chamber through the direct passage when a negative pressure is created in the crank chamber.

The suction part is configured to stay below the surface of the oil even when the oil reservoir is tilted with the oil stored therein in an amount within the rated range and the position of the oil surface is thereby changed. More specifically, the suction part includes a tubular body made of an elastic material such as rubber and a weight that has an intake port and is attached to the end of the tubular body so as to be movable downward in a vertical direction by gravity. Therefore, even when the engine is tilted, the suction part stays below the surface of the oil in the oil reservoir, so that the oil sucked from the suction part can be sufficiently delivered to the crank chamber through the oil feed passage.

The direct passage includes the plurality of openings that are spaced apart from each other and are opened in the valve-operating chamber on the one end side. More specifically, the plurality of openings provided on one end side of the direct passage are spaced apart from each other such that the one end of the direct passage is always opened at an oil accumulation position in the valve-operating chamber, even when the four-stroke engine is tilted and the oil accumulation position is thereby changed.

The opening end of the direct passage that is opened in the crank chamber is disposed at a position so as to establish communication with the crank chamber when the piston moves from a position near the top dead center toward the top dead center.

This opening end is disposed such that a negative pressure is created in the crank chamber when the opening end starts opening as the piston moves. When the piston reaches the top dead center, the opening end is already in a fully open state. Therefore, even when the oil mist is liquefied in the valve-operating chamber and a large amount of the liquefied oil stays therein, the oil can be instantaneously delivered to the crank chamber by the strong negative pressure, so that the accumulation of oil in the valve-operating chamber can be suppressed.

To suck oil in a liquid form, a strong negative pressure must be created. Even when only one of the plurality of openings of the direct passage sucks oil and the rest of the openings suck air, a strong negative pressure must be created. In the present invention, the communication between the valve-operating chamber and the crank chamber is established when the negative pressure inside the crank chamber becomes strongest. Therefore, the oil can be delivered from the valve-operating chamber to the crank chamber in a more efficient manner.

If the direct passage starts opening when the negative pressure created during pressure change inside the crank chamber is weak, the amount of intake air delivered to the crank chamber is too large, and accordingly, a negative pressure strong enough to suck the oil may not be obtained in some cases. In the present invention, the position where the direct passage starts opening is adjusted in the design process, so that a negative pressure suitable for efficiently sucking oil can be obtained. According to the present invention, the direct passage is kept opened even when the piston moves from the top dead center toward the position near the top dead center.

Therefore, a positive pressure is created in the crank chamber, and the oil and oil mist are assumed to flow back from the crank chamber to the valve-operating chamber. In such a case, a one-way valve for restricting the flow of oil and oil mist from the crank chamber to the valve-operating chamber may be provided in the direct passage to prevent the backflow.

In a ninth aspect of the present invention, the lubrication system further includes: a communication passage that, when a positive pressure is created in the crank chamber, communicates the crank chamber with the oil reservoir to deliver oil mist generated in the crank chamber to the oil reservoir; a supply passage for supplying the oil mist from the oil reservoir to the valve-operating chamber; a valve-driving chamber for accommodating driving components of the valve mechanisms, the valve-driving chamber being disposed in the supply passage; and a return passage for returning the oil in the valve-driving chamber to the crank chamber, the return passage being disposed between a bottom portion of the valve-driving chamber on the oil reservoir side and the direct passage.

The communication passage is provided to deliver the oil mist generated in the crank chamber to the oil reservoir. Since the valve-driving chamber must accommodate the driving components, the chamber must have a certain size. However, since the supply passage functions as the circulation path for oil mist, the supply passage is not required to be as wide as the valve-driving chamber. The valve-driving chamber is formed midway in the supply passage and is wider than the supply passage in communication with the valve-driving chamber. The bottom portion of the valve-driving chamber is a step portion formed at a connection portion between a part of the supply passage and the valve-driving chamber.

When the oil mist supplied to the supply passage lubricates the driving components of the valve mechanisms, the oil mist adheres to the driving components of the valve mechanisms and is then liquefied. The liquefied oil is returned to the crank chamber through the return passage, and therefore oil mist further reduced in concentration is supplied to the valve-operating chamber. Even when the oil is not sufficiently returned to the crank chamber through the return passage, since the driving components of the valve mechanisms are provided midway in the supply passage, which function as resistances, the flow of oil into the valve-operating chamber can be suppressed. Even when the oil mist at a concentration higher than necessary is supplied from the oil reservoir to the supply passage, since one of the opening ends of the return passage is provided in the bottom portion of the valve-driving chamber on the oil reservoir side, the oil can be accumulated in the bottom portion before the oil reaches the driving components of the valve mechanisms. Then, the accumulated oil is returned to the crank chamber. The shapes of the supply passage and the return passage are design issues. In consideration of these design issues, the oil mist at a more appropriate concentration can be supplied to the valve-operating chamber. Since the oil in the valve-driving chamber is also delivered to the crank chamber through the direct passage, the oil can be efficiently delivered to the crank chamber as in the above aspect.

In a tenth aspect of the present invention, the opening end of the oil feed passage that is opened in the crank chamber is disposed at a position so as to be opened before the communication of the opening end of the direct passage on the crank chamber side with the crank chamber is established.

Since the communication of the opening end of the oil feed passage on the crank chamber side with the crank chamber is established before the communication of the opening end of the direct passage on the crank chamber side with the crank chamber is established, the opening end of the direct passage is closed when the communication between the opening end of the oil feed passage with the crank chamber is established. Therefore, a sufficient amount of oil can be first supplied to the crank chamber through the oil feed passage, and then the opening end of the direct passage establishes communication with the crank chamber, so that a sufficient amount of air can also be supplied. If the respective opening ends of the direct passage and the oil feed passage simultaneously establishes the communication with the crank chamber, only low-viscous air is sucked into the crank chamber.

The lubrication system for a four-stroke engine according to the present invention includes: an oil feed passage that, when a negative pressure is created in the crank chamber, communicates the oil reservoir with the crank chamber to deliver the oil stored in a liquid form in the oil reservoir to the crank chamber; a communication passage that, when a positive pressure is created in the crank chamber, communicates the crank chamber with the oil reservoir to deliver oil mist generated in the crank chamber to the oil reservoir; liquefying means provided in the oil reservoir, for liquefying the oil mist delivered from the communication passage to the oil reservoir to reduce the concentration of the oil mist; and a supply passage for supplying the oil mist from the oil reservoir to the valve-operating chamber by means of the liquefying means. Therefore, the driving components in the crank chamber can be sufficiently lubricated, and the valve mechanisms accommodated in the valve-operating chamber can be sufficiently lubricated with the oil mist appropriately reduced in concentration by means of the liquefying means. Since the oil mist is prevented from being supplied to the valve-operating chamber at a concentration higher than necessary, the amount of oil discharged together with blow-by gas can be reduced, and the oil consumption can thereby be reduced.

In another lubrication system for a four-stroke engine according to the present invention, a valve-driving chamber for accommodating the driving components of valve mechanisms is disposed in the supply passage, and a return passage for returning the oil in the valve-driving chamber to the crank chamber is disposed between the bottom portion of the valve-driving chamber on the oil reservoir side and the crank chamber. Accordingly, the supply of the oil in the valve-driving chamber to the valve-operating chamber can be suppressed, and the oil consumption can thereby be further suppressed.

In another lubrication system for a four-stroke engine according to the present invention, a direct passage is provided which communicates the valve-operating chamber with the crank chamber when a negative pressure is created in the crank chamber. Therefore, even when the oil is accumulated in the valve-operating chamber, the accumulated oil can be returned to the crank chamber. The accumulation of oil in the valve-operating chamber can thereby be further suppressed, and the oil consumption can be further reduced.

Another lubrication system for a four-stroke engine according to the present invention includes an oil feed passage including a suction part. The suction part is positioned so as to stay below a surface of the oil even when the oil reservoir is tilted with the oil stored therein in an amount within a rated range and the position of the surface of the oil is thereby changed. The oil feed passage is configured such that, when a negative pressure is created in the crank chamber, the oil reservoir and the crank chamber are in communication with each other through the oil feed passage so that the oil in the oil reservoir is sucked through the suction part and is delivered to the crank chamber. The oil feed passage has an opening end that is opened in the crank chamber, the opening end being positioned so as to establish communication with the crank chamber when the piston moves from a position near a top dead center toward the top dead center. In this configuration, even when the oil reservoir is tilted, the suction part always stays below the oil surface. Therefore, the oil in a liquid form sucked from the oil reservoir through the oil feed passage can be sufficiently delivered to the crank chamber, and lubrication failure can be prevented from occurring in the crankshaft and components therearound.

Furthermore, the lubrication system includes a direct passage having a plurality of openings that are spaced apart from each other, are opened in the valve-operating chamber at one ends and are opened in the crank chamber at the other ends, so as to communicate the valve-operating chamber with the crank chamber when a negative pressure is created in the crank chamber. The opening end of the direct passage that is opened in the crank chamber is positioned so as to establish communication with the crank chamber when the piston moves from a position near the top dead center toward the top dead center. In this configuration, when the piston moves from the position near the top dead center toward the top dead center, the direct passage establishes communication with the crank chamber at its one end, and the negative pressure inside the crank chamber can be effectively applied to the direct passage. Therefore, the oil accumulated in the valve-operating chamber can be reliably sucked and returned to the crank chamber, and the accumulation of oil in the valve-operating chamber can be suppressed.

DETAILED DESCRIPTION OF THE PREFERRED EMBODIMENTS

First Embodiment

Figure 1:
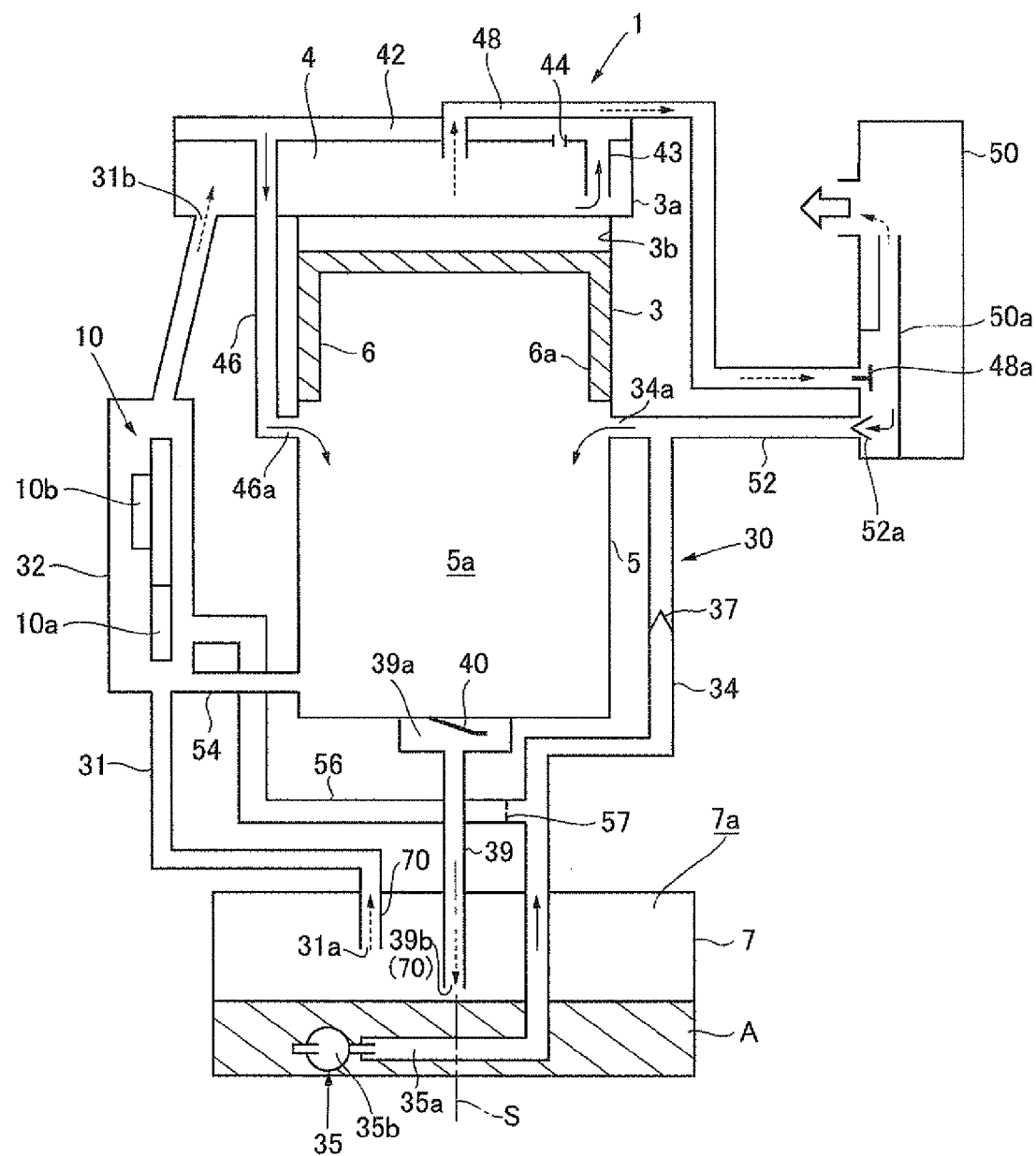
FIG. 1 is a schematic diagram illustrating a lubrication system for a four-stroke engine according to one embodiment of the present invention.
Figure 2:
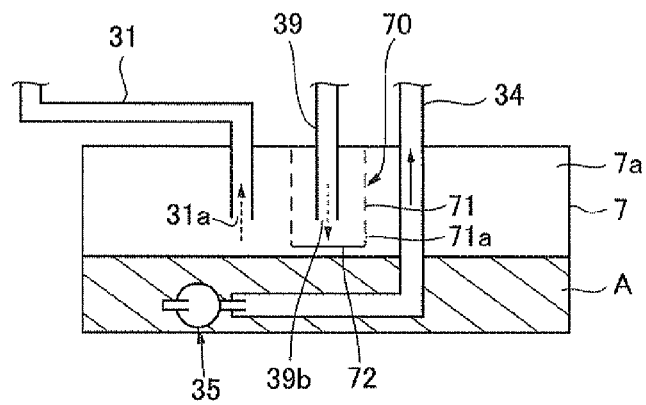
FIG. 2A illustrates liquefying means in the lubrication system, the liquefying means being formed into a bag shape with a large number of holes and including a collision part on its bottom portion.
FIG. 2B illustrates liquefying means including a plate-shaped collision part.
FIG. 2C illustrates liquefying means including a tubular collision part.
Figure 2:
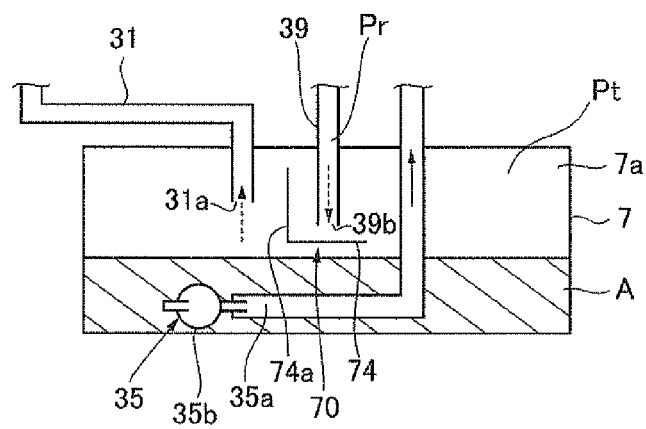
Figure 2:
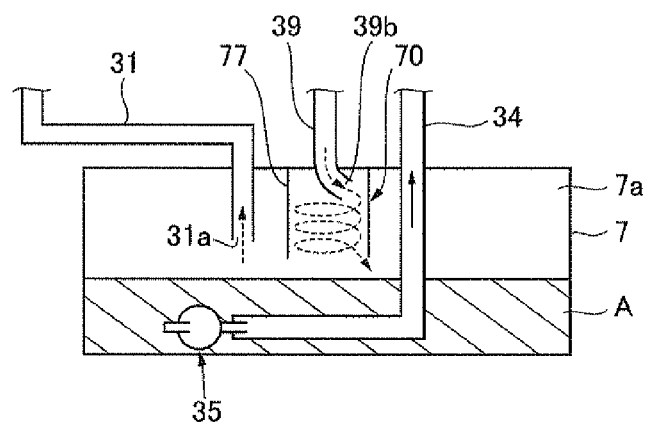

Hereinafter, one of preferred embodiments of a lubrication system for a four-stroke engine of the present invention will be described with reference to FIGS. 1 to 4. The lubrication system is installed in a four-stroke engine, and therefore a description will be given of the four-stroke engine equipped with the lubrication system with reference to FIG. 1 (schematic diagram). FIG. 1 shows the four-stroke engine when a piston is at the top dead center.

The four-stroke engine 1 (hereinafter referred to simply as "engine 1") includes a cylinder block 3 integrated with a cylinder head 3a, a crank case 5 that is attached to the lower portion of the cylinder block 3 and forms a crank chamber 5a, and an oil reservoir 7 disposed below the crank case 5, as shown in FIG. 1. The oil reservoir 7 is provided separately from the crank case 5 and stores lubricating oil A (hereinafter referred to simply as "oil A").

A crankshaft (not shown) is rotatably supported on the connection part of the cylinder block 3 to the crank case 5, and the piston 6 is connected to the crankshaft through a counterweight, a connecting rod connected thereto, and other components. The piston 6 is slidably inserted into a cylinder 3b formed in the cylinder block 3.

An intake port and an exhaust port that communicate with a carburetor (not shown) and an exhaust muffler (not shown), respectively, are provided in the upper wall of the cylinder 3b formed in the cylinder block 3, and an intake valve and an exhaust valve for opening and closing the intake and exhaust ports are disposed in these ports.

A valve-operating mechanism 10 for driving these valves includes a valve-driving gear 10a that is fixed to the crankshaft, a cam gear 10b driven by the valve-driving gear 10a and connected to a cam, rocker arms (not shown), and other components. The valve-driving gear 10a and the cam gear 10b in the valve-operating mechanism 10 are accommodated in a valve-driving chamber 32 provided midway in a supply passage 31 that communicates the oil reservoir 7 with a valve-operating chamber 4 formed on the top portion of the cylinder block 3, and the other components such as the rocker arms are disposed in the valve-operating chamber 4.

An oil feed passage 34 is disposed between the oil reservoir 7 and the cylinder block 3. A suction part 35 is attached to the end of the oil feed passage 34 on the oil reservoir side. The suction part 35 includes: a tubular portion 35a that is formed of an elastic material such as rubber and is easily bendable; and a weight 35b having an intake port and attached to the end of the tubular portion 35a. The weight 35b of the suction part 35 is attached so as to be movable downward in a vertical direction by gravity. Therefore, even when the oil reservoir 7 is tilted, the intake port of the suction part 35 can stay below the surface of the oil A that is stored in the oil reservoir 7 in an amount within a rated range.

When a negative pressure tends to be created in the crank chamber 5a as the piston 6 moves upward, the oil feed passage 34 allows the crank chamber 5a and the oil reservoir 7 to be in communication with each other so that the oil A is thereby sucked from the oil reservoir 7 and supplied to the crank chamber 5a through the oil feed passage 34. An opening end 34a of the oil feed passage 34 being opened in the crank chamber 5a is disposed so as to establish communication with the crank chamber 5a when the piston 6 moves from a position near a top dead center toward the top dead center. This opening end 34a is positioned on the bottom dead center side of a skirt 6a provided in the lower portion of the piston when the piston is moved to the position near the top dead center. Therefore, the opening end 34a of the oil feed passage 34 is already in a fully open state when the piston 6 reaches the top dead center.

The oil feed passage 34 may be allowed to be in communication with the crank chamber 5a, when a negative pressure is created in the crank chamber 5a, by providing a reed valve at the opening end 34a of the oil feed passage 34, or providing a passage in the crankshaft so as to function as a rotary valve.

A one-way valve 37 is provided in the oil feed passage 34. The one-way valve 37 is configured so as to be opened and closed according to the change in pressure inside the crank chamber 5a. More specifically, the one-way valve 37 is opened to communicate the oil feed passage 34 with the crank chamber 5a when the pressure inside the crank chamber 5a is lower than the pressure inside the oil reservoir 7. The one-way valve 37 is closed when the pressure inside the crank chamber 5a is higher than the pressure inside the oil reservoir 7.

A communication passage 39 for communicating the crank chamber 5a with the oil reservoir 7 is provided between the bottom portion of the crank chamber 5a and the oil reservoir 7. The communication passage 39 is used to deliver oil mist generated in the crank chamber 5a and liquid oil formed by liquefaction of the oil mist to the oil reservoir 7. A reed valve 40 is provided at the opening end 39a of the communication passage 39 being opened in the crank chamber. The reed valve 40 is configured so as to be opened and closed according to the change in pressure inside the crank chamber 5a. More specifically, the reed valve 40 is opened by a positive pressure created inside the crank chamber when the piston 6 moves toward the bottom dead center, so that the communication passage 39 is allowed to communicate with the crank chamber. Therefore, when the reed valve 40 is opened to allow the communication passage 39 to be in communication with the crank chamber, the oil mist and oil in the crank chamber 5a is delivered to the oil reservoir 7 through the communication passage 39.

The communication passage 39 has an opening end 39b being opened at substantially the center of the oil reservoir 7. Irrespective of the tilted state of the oil reservoir 7, the opening end 39b is located at a position above the surface of the oil A that is stored in the oil reservoir 7 in an amount equal to or less than the rated amount. Therefore, the oil mist ejected from the opening end 39b of the communication passage 39 is blown against the oil surface, and the oil is not bubbled. Accordingly, the oil mist is gently returned to the oil reservoir 7, and most of the oil mist is liquefied. However, part of the oil mist ejected from the opening end 39b bounces off the oil surface and the wall surfaces of the oil reservoir 7 and stays in a space 7a above the oil surface in the oil reservoir 7. As described above, the opening end 39b of the communication passage 39 that is disposed above the surface of the oil A functions as a part of liquefying means for liquefying oil mist.

Therefore, most of the oil mist ejected from the communication passage 39 is liquefied, so that the concentration of oil mist staying in the oil reservoir 7 can be reduced.

An opening end 31a of the supply passage 31 is opened at substantially the center of the inner space of the oil reservoir 7. Irrespective of the tilted state of the oil reservoir 7, the opening end 31a never stays below the surface of the oil A stored in the oil reservoir 7 in an amount equal to or less than the rated amount, even when the position of the oil surface is changed. Moreover, the opening end 31a is disposed such that the opening end 39b protrudes further than the opening end 31a.

As described above, the opening end 39b of the communication passage 39 and the opening end 31a of the supply passage 31 are disposed in the oil reservoir 7 such that the opening end 39b protrudes further than the opening end 31a. Therefore, the oil mist ejected from the opening end 39b of the communication passage 39 does not directly enter the opening end 31a of the supply passage 31. Preferably, the communication passage 39 and the supply passage 31 may be disposed so as to be spaced apart from each other toward the respective opening ends (see FIG. 4). More specifically, when the opening end 31a and an end portion 31a' in the vicinity thereof of the supply passage 31 are located on the base portion side of the communication passage 39 with respect to a plane 39c that is located at the opening end 39b and orthogonal to the extending direction of the communication passage 39 (the direction shown by an alternate long and short dash line), the oil mist ejected from the communication passage 39 does not directly enter the opening end 31a of the supply passage 31. In other words, the arrangement of the supply passage 31 and the communication passage 39 in the oil reservoir 7 functions as a flow blocking unit for preventing the oil mist ejected from the communication passage 39 from directly flowing into the opening end 31a of the supply passage 31. Therefore, the concentration of the oil mist flowing through the supply passage 31 is lower than the concentration of the oil supplied from the oil feed passage 34 to the crank chamber 5a.

An opening end 31b of the supply passage 31 on the valve-operating chamber 4 side is in communication with the valve-operating chamber 4 on its cylinder block 3 side. Therefore, the oil mist flowing through the supply passage 31 lubricates a valve-operating mechanism 10 in the valve driving chamber 32. The oil mist is then ejected from the opening end 31b and supplied to the valve-operating chamber 4, so as to lubricate the rocker arms and other components in the valve-operating chamber 4.

A plurality of suction tubes 43 are provided in the valve-operating chamber 4 to suck the oil accumulated in the valve-operating chamber 4. The suction tubes 43 are connected to a suction passage 42. The suction passage 42 is disposed in the valve-operating chamber 4 so as to be located on the side opposite to the crank chamber 5a. The suction tubes 43 are in communication with the suction passage 42 and extend into the valve-operating chamber 4 toward the crank chamber, and each of the suction tubes 43 has an opening end. The opening ends of the suction tubes 43 are disposed near the bottom surface of the valve-operating chamber 4 on the crank chamber side in order to suck oil present on the bottom surface on the crank chamber side within the valve-operating chamber 4. The suction tubes 43 are disposed near the corners of the valve-operating chamber 4. Therefore, even when the engine 1 is tilted with the valve-operating chamber 4 located in an upper position, the oil accumulated in the valve-operating chamber 4 is sucked through any one of the suction tubes 43.

A plurality of small holes 44 are formed in the suction passage 42. These small holes 44 are disposed on the side opposite to the crank chamber 5a so as to be located near the corners of the valve-operating chamber 4. Therefore, even when the engine 1 is tilted and held upside down with the valve-operating chamber 4 located at a lower position, the oil accumulated in the valve-operating chamber 4 can be sucked through any one of the small holes 44.

A direct passage 46 is provided to the suction passage 42, and the valve-operating chamber 4 communicates with the crank chamber 5a through the direct passage 46 when a negative pressure is created in the crank chamber 5a. As in the opening end 34a of the oil feed passage 34, an opening end 46a of the direct passage 46 being opened in the crank chamber is disposed so as to establish communication with the crank chamber when the piston 6 moves from a position near the top dead center toward the top dead center. This opening end 46a is positioned on the bottom dead center side of the skirt 6a provided in the lower portion of the piston when the piston is moved to the position near the top dead center. Therefore, the opening end 46a of the direct passage 46 is already in a fully open state when the piston 6 reaches the top dead center.

A one-way valve that allows a flow from the valve-operating chamber 4 toward the crank chamber 5a but prevents a flow from the crank chamber 5a toward the valve-operating chamber 4 may be provided in the direct passage 46. In this manner, the back flow of oil and oil mist from the crank chamber 5a to the valve-operating chamber 4 can be reliably prevented.

The one end of a breather passage 48 is opened at substantially the center of the valve-operating chamber 4, and the other end of the breather passage 48 is connected to an air cleaner 50. The breather passage 48 is provided to discharge blow-by gas into a combustion chamber. The oil mist and blow-by gas in the valve-operating chamber 4 are delivered to the air cleaner 50 through the breather passage 48, and the oil and the blow-by gas are separated by an oil separator 50a provided in the air cleaner 50. As described above, the breather passage 48 at its one end is opened at substantially the center of the valve-operating chamber 4. Therefore, even when a large amount of oil stays in the valve-operating chamber 4, the oil is not easily sucked. A one-way valve 48a is provided in the breather passage 48, and the backflow of blow-by gas and oil mist from the air cleaner 50 toward the valve-operating chamber 4 is prevented by the one-way valve 48a.

The liquid oil separated from the gas component is delivered to the crank chamber 5a through a circulation passage 52 that communicates the air cleaner 50 with the crank chamber 5a. A one-way valve 52a that allows only a flow toward the crank chamber is disposed in the circulation passage 52. The blow-by gas separated from the liquid component is delivered to the combustion chamber together with intake air.

A return passage 54 for returning the oil in the valve driving chamber 32 to the crank chamber 5a is provided between the crank chamber 5a and the bottom portion of the valve driving chamber 32 on the oil reservoir side. When a negative pressure is created in the crank chamber 5a, the oil accumulated in the valve driving chamber 32 is sucked through the return passage 54. The return passage 54 is formed to have a cross-sectional area smaller than 1/10 of the cross-sectional area of the communication passage 39. When a positive pressure is created in the crank chamber 5a, the reed valve 40 is opened, and the crank chamber 5a and the oil reservoir 7 are thereby in communication with each other. The oil mist and oil in the crank chamber 5a flow through the communication passage 39 having a large cross-sectional area, and the return passage 54 is blocked with oil. Therefore, almost no oil flows back from the crank chamber 5a to the valve driving chamber 32. In the present embodiment, the inner diameter of the communication passage 39 is set to ϕ9 mm, and the inner diameter of the return passage 54 is set to ϕ2 mm.

The return passage 54 may be provided such that the valve driving chamber 32 and the direct passage 46 are in communication with each other. By providing the return passage 54 in the manner described above, oil is not supplied more than necessary to the valve-operating chamber 4. A one-way valve that allows a flow toward the crank chamber but prevents a flow toward the valve driving chamber 32 may be provided in the return passage 54. In this manner, the backflow of oil from the crank chamber 5a to the valve driving chamber 32 can be reliably prevented.

A flow rate control passage 56 is provided between the valve driving chamber 32 and the oil feed passage 34. The air in the valve driving chamber 32 is sucked into the flow rate control passage 56, and the flow rate of oil supplied to the crank chamber 5a through the oil feed passage 34 is thereby controlled. When the amount of sucked air is large, the flow rate of oil supplied through the oil feed passage 34 is low. Preferably, the flow rate control passage 56 is disposed so as to be spaced apart from the bottom portion of the valve driving chamber 32 so that the oil staying in the valve driving chamber 32 is less likely to be sucked.

The flow rate control passage 56 is connected to the oil feed passage 34 at a position that is closer to the oil reservoir than the one-way valve 37 provided in the oil feed passage 34. Therefore, when the supply of oil is stopped by the one-way valve 37, the oil in the oil feed passage 34 is accumulated on the oil reservoir side of the one-way valve 37, and the oil is accumulated in the connection portion of the flow rate control passage 56 to the oil feed passage 34. Therefore, when air is sucked from the flow rate control passage 56 into the oil feed passage 34, only the air does not flow through the oil feed passage 34, but the oil in the oil feed passage 34 is delivered to the crank chamber 5a together with the air delivered from the valve driving chamber 32.

A flow restrictor 57 for controlling the flow rate of air delivered from the valve driving chamber 32 to the oil feed passage 34 is provided in the flow rate control passage 56. By controlling the flow restrictor 57 to adjust the amount of air sucked from the valve driving chamber 32, the flow rate of oil supplied to the crank chamber 5a through the oil feed passage 34 can be controlled. More specifically, the flow rate of oil can be easily controlled only by the design of the flow restrictor 57, irrespective of the inner diameter of the flow rate control passage 56.

The flow restrictor 57 may not be provided separately from the flow rate control passage 56 and may be provided as a part of the flow rate control passage 56. For example, if a part of the flow rate control passage 56 is formed along the sealing surface between the cylinder block 3 and the crank case 5 and is connected to the oil feed passage 34 at a position on the sealing surface, the flow restrictor 57 can be easily formed.

More specifically, the circulation path of the lubrication system 30 includes the oil feed passage 34, the communication passage 39, the supply passage 31, the suction tubes 43, the small holes 44, the suction passage 42, the direct passage 46, the breather passage 48, the circulation passage 52, the return passage 54, and the flow rate control passage 56.

When the engine 1 is started, pressure changes occur in the crank chamber 5a due to the upward and downward movement of the piston 6. When the piston 6 moves upward, the pressure inside the crank chamber 5a is reduced, so that a negative pressure tends to be created. When the piston 6 moves downward, the pressure inside the crank chamber 5a is increased, so that a positive pressure tends to be created.

As the piston 6 moves to the vicinity of the top dead center, a negative pressure tends to be created in the crank chamber 5a, and communication between the opening end 34a of the oil feed passage 34 and the crank chamber 5a is established. Then the crank chamber 5a communicates with the oil reservoir 7, and the negative pressure created in the crank chamber 5a is applied to the oil feed passage 34. Even when the engine 1 is tilted, the suction part 35 of the oil feed passage 34 stays below the surface of the oil A in the oil reservoir 7, and the oil A is sucked from the oil reservoir 7 and is delivered to the crank chamber 5a. Since the opening end 34a is already in a fully open state when the piston 6 reaches the top dead center, the negative pressure in the crank chamber 5a can be sufficiently applied to the oil feed passage 34. Therefore, the oil A sucked from a position below the oil surface can be sufficiently supplied to the crank chamber 5a.

The oil delivered to the crank chamber 5a lubricates the driving components such as the piston 6 and the crankshaft and is simultaneously scattered by the driving components to form oil mist. Part of the oil mist adheres to the wall surfaces of the crank chamber 5a and is re-liquefied.

When the piston 6 moves downward from the top dead center, a positive pressure is created in the crank chamber 5a instead, and the reed valve 40 is opened to communicate the crank chamber 5a with the oil reservoir 7. Then, the oil mist and oil increased in pressure in the crank chamber 5a are delivered to the oil reservoir 7 through the communication passage 39, and the pressure inside the oil reservoir 7 is increased. The oil mist ejected from the communication passage 39 collides with the surface of the oil A stored in the oil reservoir 7 and with the wall surfaces of the oil reservoir 7, is thereby liquefied, and is stored in the oil reservoir 7. The concentration of the remaining oil mist that has collided and bounced off within the oil reservoir 7 is lower than the concentration of oil mist in the crank chamber 5a. When a positive pressure is created in the crank chamber 5a, the oil feed passage 34 is blocked by the action of the one-way valve 37 so that oil is prevented from flowing back from the crank chamber 5a to the oil reservoir 7, and then the opening end 34a is closed by the piston 6.

When the pressure inside the oil reservoir 7 is increased, a pressure gradient is generated between the oil reservoir 7 and the valve-operating chamber 4. The oil mist accumulated in the oil reservoir 7 is delivered to the valve-operating chamber 4 through the supply passage 31. In the process of delivering the oil mist from the oil reservoir 7 to the valve-operating chamber 4, the components included in the valve-operating mechanism 10 in the valve driving chamber 32 provided in the supply passage 31 are lubricated. During this process, part of the oil mist is liquefied.

The oil liquefied in the valve driving chamber 32 can be delivered to the crank chamber 5a through the return passage 54. Therefore, excessive accumulation of oil in the valve driving chamber 32 can be prevented, and the flow of oil to the valve-operating chamber 4 can thereby be prevented. In addition, clogging of the supply passage 31 with oil can be prevented.

The oil mist supplied to the valve-operating chamber 4 lubricates the valve-operating mechanism provided in the valve-operating chamber 4 and is delivered to the crank chamber 5a through the direct passage 46. Even when the oil mist supplied to the valve-operating chamber 4 is liquefied and stays therein, a strong negative pressure in the crank chamber 5a is applied to the liquefied oil, and therefore the oil can be delivered to the crank chamber 5a, so that the oil is prevented from staying in the valve-operating chamber 4.

Therefore, the oil is prevented from being emitted together with blow-by gas discharged from the valve-operating chamber 4 through the breather passage 48.

The liquefying means 70 may be configured as shown in FIG. 2A. More specifically, to enhance the function of liquefying oil mist, a tubular punched metal plate 71 is disposed around the opening end 39b of the communication passage 39, and a collision plate 72 is disposed at the bottom portion of the punched metal plate 71 so as to be located on the front side of the opening end 39b in the protruding direction of the communication passage 39. In this configuration, the oil mist ejected from the communication passage 39 collides with the collision plate 72 and is liquefied, and the liquefied oil is discharged from holes 71a formed in the punched metal plate 71. Since the opening end 39b is surrounded by the punched metal plate 71, the concentration of the oil mist to be supplied to the supply passage 31 can be further reduced.

The liquefying means 70 may be configured as shown in FIG. 2B. More specifically, a collision plate 74 is provided such that the oil mist ejected from the opening end 39b adheres to the collision plate 74 and is then liquefied. In addition to this, a protruding portion 74a protruding toward the rear side of the communication passage 39 in the extending direction thereof is provided on the supply passage-side end of the collision plate 74, and the protruding portion 74a may block the space between the opening end 39b and the opening end 31a. In this configuration, the oil mist ejected from the opening end 39b of the communication passage 39 collides with the collision plate 74 and is then liquefied, and the liquefied oil is discharged from the edge (discharge portion) of the collision plate 74 and is returned to the oil stored in the oil reservoir 7. The oil mist ejected from the opening end 39b is blocked by the protruding portion 74a, so that substantially no oil mist directly enters the opening end 31a of the supply passage 31. The concentration of the oil mist supplied to the supply passage 31 can thereby be reduced.

The liquefying means 70 may be configured as shown in FIG. 2C. More specifically, a tubular liquefaction body 77 is attached inside the oil reservoir 7 so as to surround the communication passage 39, and the opening end 39b is tilted such that the oil mist ejected from the opening end 39b of the communication passage 39 flows along the inner surface of the liquefaction body 77 in the circumferential direction thereof. In this configuration, the oil mist ejected from the opening end 39b is separated by centrifugal force into air and oil. The separated oil adheres to the inner surface of the liquefaction body 77 (collision part) and is then liquefied, and the liquefied oil moves downward along the inner surface, is discharged from the edge (discharge portion) of the liquefaction body 77, and is returned to the oil stored in the oil reservoir 7. To facilitate the adhesion of oil to the inner surface, the surface roughness of the inner surface may be increased, and a groove (for example, a linear groove or a spiral groove) extending from one end to the other end of the inner surface may be provided in the inner surface.

This liquefying means 70 has high liquefaction efficiency and can reduce the concentration of the oil mist supplied to the supply passage 31, since the liquefaction body 77 surrounds the opening end 39b and the space between the opening end 39b and the opening end 31a is blocked.

Figure 3:
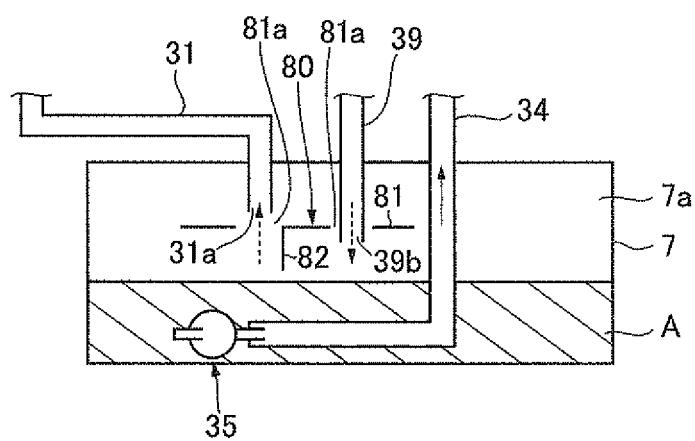
FIG. 3 is a schematic diagram illustrating a flow blocking unit in the lubrication system for a four-stroke engine according to one embodiment of the present invention.
Figure 4:
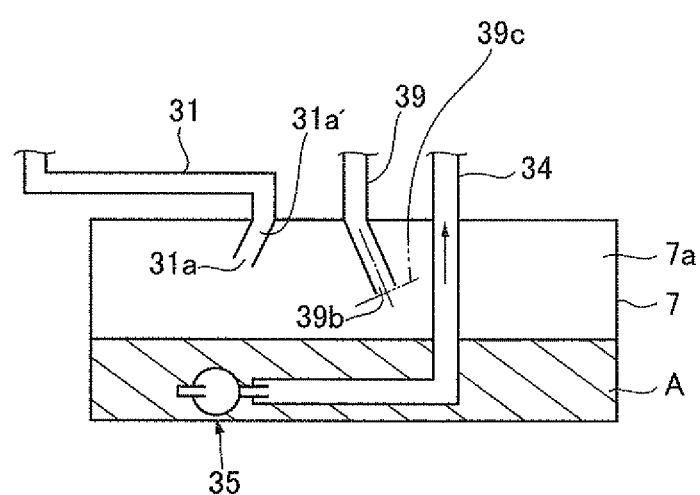
FIG. 4 is a schematic diagram illustrating the structures of a communication passage and a supply passage on the oil reservoir side in the lubrication system for a four-stroke engine according to another embodiment of the present invention.

The liquefying means 70 may be configured as shown in FIG. 3. More specifically, a flow blocking unit 80 having a flow blocking function is disposed between the opening end 39b of the communication passage 39 and the opening end 31a of the supply passage 31. In addition, a bent portion 82 is formed at the end of the flow blocking unit 80 on the supply passage side so as to protrude in the extending direction of the communication passage 39 such that the space between the opening end 39b and the opening end 31a is blocked.

The flow blocking unit 80 further has a flow restriction plate 81, and the flow restriction plate 81 and the bent portion 82 are disposed so as to sandwich the opening end 39b. The flow blocking unit 80 can be obtained by forming two holes 81a that face the opening ends 31a and 39b, respectively. The hole 81a facing the opening end 31a is formed so as to be bent. The flow restriction plate 81 may be formed as a bent single plate-shaped member having holes as described above or may be composed of a plurality of parts. When the flow restriction plate 81 is formed as a single plate-shaped member, the oil reservoir 7 can be easily partitioned into two sections, and a wave-dissipating effect on the oil surface can be obtained.

By providing the flow restriction plate 81 near the opening end 31a of the supply passage 31 as described above, the space between the opening end 39b and the opening end 31a is blocked. Accordingly, the concentration of the oil mist supplied to the supply passage 31 can thereby be reduced.

Various embodiments of the liquefying means 70 have been shown to clarify the idea of the present invention. However, the liquefying means of the present invention is not limited to these exemplary embodiments. A combination of the return passage 54, the direct passage 46, and other components with any of the embodiments of the liquefying means 70 can reduce the concentration of the oil mist within the range necessary for lubricating the valve-operating mechanism 10, and excessive accumulation of the oil in the valve-operating chamber 4 can thereby be prevented.

Second Embodiment

Figure 5:
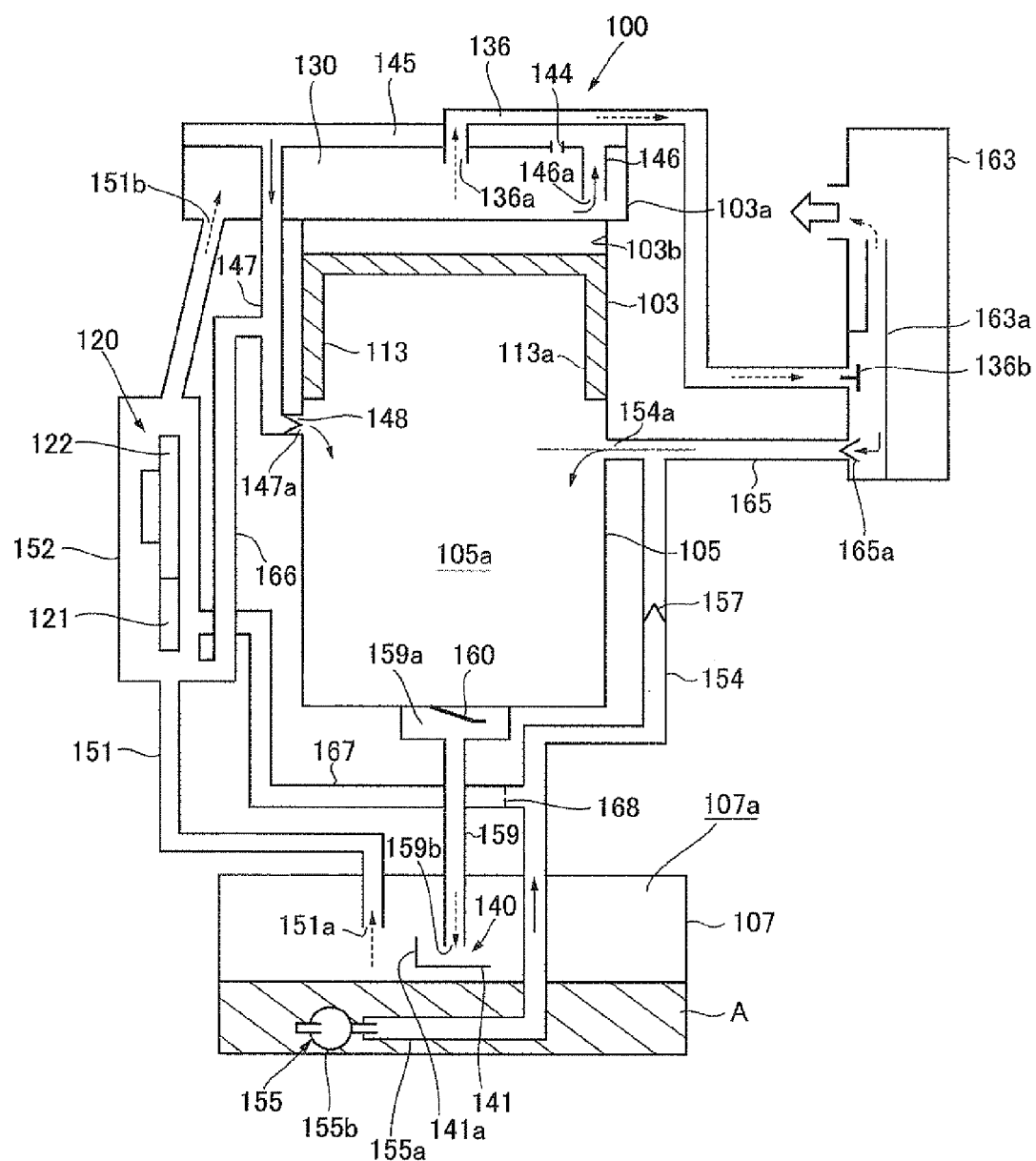
FIG. 5 is a schematic diagram illustrating the lubrication system for a four-stroke engine according to another embodiment of the present invention, when a piston is at the top dead center.
Figure 6:
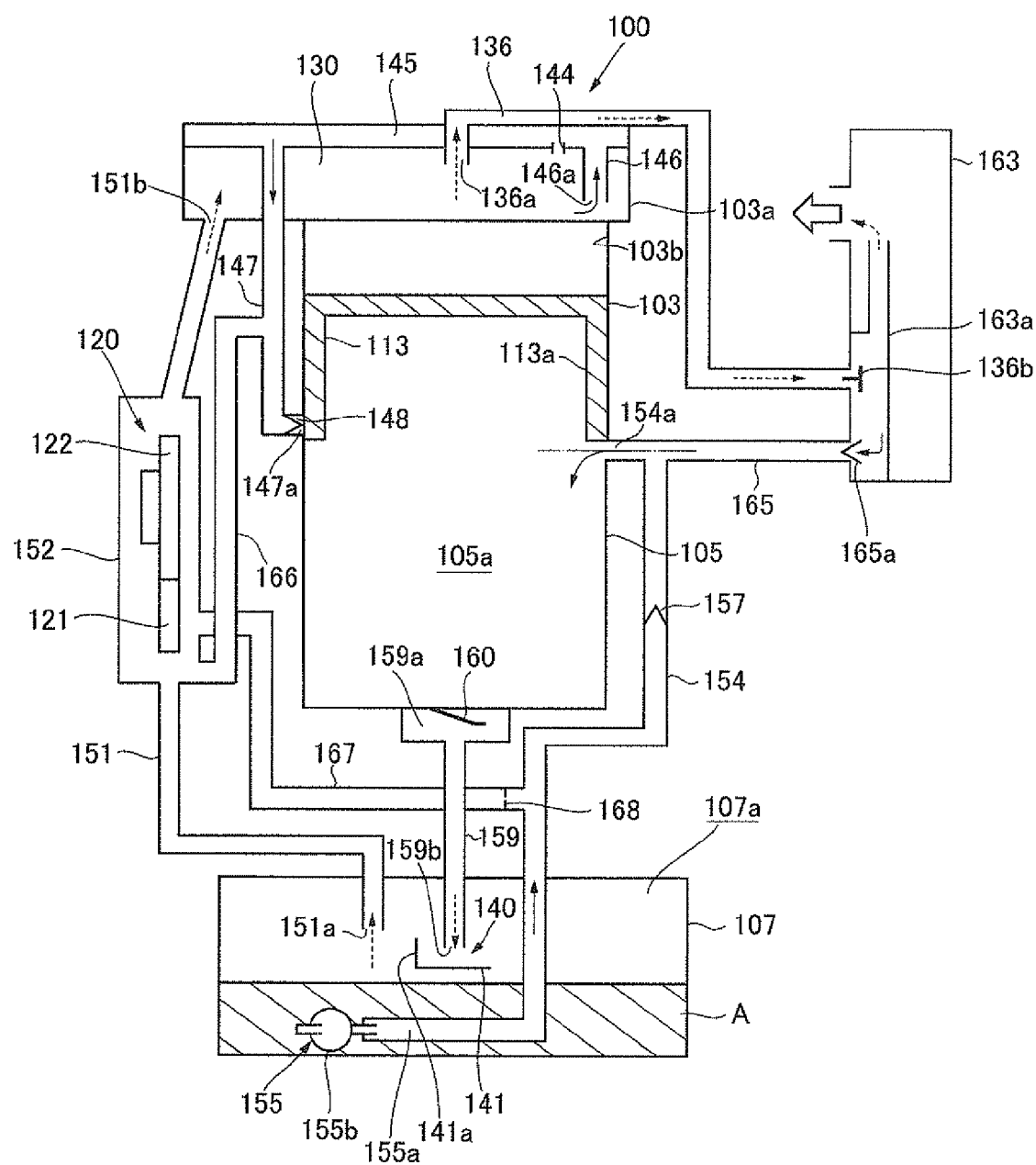
FIG. 6 is a schematic diagram illustrating the lubrication system for a four-stroke engine according to the embodiment of the present invention shown in FIG. 5, when the opening end of an oil feed passage on the crank chamber side is opened and the opening end of a direct passage on the crank chamber side is closed.

Hereinafter, another preferred embodiment of a lubrication system for a four-stroke engine of the present invention will be described with reference to FIGS. 5 and 6. The lubrication system is installed in a four-stroke engine, and therefore a description will be given of the four-stroke engine equipped with the lubrication system with reference to FIG. 5 (schematic diagram). FIG. 5 shows the four-stroke engine when a piston is at the top dead center.

The four-stroke engine 100 (hereinafter referred to simply as "engine 100") includes a cylinder block 103 integrated with a cylinder head 103a, a crank case 105 that is attached to the lower portion of the cylinder block 103 and forms a crank chamber 105a, and an oil reservoir 107 disposed below the crank case 105, as shown in FIG. 5. The oil reservoir 107 is provided separately from the crank case 105 and stores lubricating oil A (hereinafter referred to simply as "oil A").

A crankshaft (not shown) is rotatably supported by the cylinder block 103 and the crank case 105. A piston 113 is connected to the crankshaft through a counter weight and a connecting rod connected thereto, and the like. The piston 113 is slidably inserted into a cylinder 103b formed in the cylinder block 103.

An intake port and an exhaust port that communicate with a carburetor (not shown) and an exhaust muffler (not shown), respectively, are provided in the upper wall of the cylinder 103b formed in the cylinder block 103, and an intake valve and an exhaust valve for opening and closing the intake and exhaust ports are disposed in these ports.

A valve-operating mechanism 120 for driving these valves includes: a valve-driving gear 121 that is secured to the crankshaft; a cam gear 122 driven by the valve driving gear 121 and connected to a cam; rocker arms (not shown); and other components. The valve-driving gear 121 and the cam gear 122 of the valve-operating mechanism 120 are accommodated in a valve-driving chamber 152 provided midway in a supply passage 151 that communicates the oil reservoir 107 with a valve-operating chamber 130 formed on the head portion of the cylinder block 103. The rocker arms and other components are provided within the valve-operating chamber 130.

An oil feed passage 154 is disposed between the oil reservoir 107 and the cylinder block 103. A suction part 155 is attached to the end of the oil feed passage 154 on the oil reservoir side. The suction part 155 includes: a tubular portion 155a that is formed of an elastic material such as rubber and is easily bendable; and a weight 155b having an intake port and attached to the end of the tubular portion 155a. The weight 155b of the suction part 155 is attached so as to be movable downward in a vertical direction by gravity. Therefore, even when the oil reservoir 107 is tilted, the intake port of the suction part 155 can stay below the surface of the oil A that is stored in the oil reservoir 107 in an amount within a rated range.

When a negative pressure tends to be created in the crank chamber 105a as the piston 113 moves upward, the oil feed passage 154 allows the crank chamber 105a and the oil reservoir 107 to be in communication with each other so that the oil A is thereby sucked from the oil reservoir 107 and supplied to the crank chamber 105a through the oil feed passage 154. An opening end 154a of the oil feed passage 154 being opened in the crank chamber 105a is disposed so as to establish communication with the crank chamber 105a when the piston 113 moves from a position near a top dead center toward the top dead center. This opening end 154a is positioned on the bottom dead center side of a skirt 113a provided in the lower portion of the piston when the piston is moved to the position near the top dead center. Therefore, the opening end 154a of the oil feed passage 154 is already in a fully open state when the piston 113 reaches the top dead center. The position of the opening end 154a of the oil feed passage 154 will be described later in detail.

A one-way valve 157 is provided in the oil feed passage 154. The one-way valve 157 is configured so as to be opened and closed according to the change in pressure inside the crank chamber 105a. More specifically, the one-way valve 157 is opened to communicate the oil feed passage 154 with the crank chamber 105a when the pressure inside the crank chamber 105a is lower than the pressure inside the oil reservoir 107. The one-way valve 157 is closed when the pressure inside the crank chamber 105a is higher than the pressure inside the oil reservoir 107.

A communication passage 159 for communicating the crank chamber 105a with the oil reservoir 107 is provided between the bottom portion of the crank chamber 105a and the oil reservoir 107. The communication passage 159 is used to deliver oil mist generated in the crank chamber 105a and liquid oil formed by liquefaction of the oil mist to the oil reservoir 107. A reed valve 160 is provided at the opening end 159a of the communication passage 159 being opened in the crank chamber. The reed valve 160 is configured so as to be opened and closed according to the change in pressure inside the crank chamber 105a. More specifically, the reed valve 160 is opened by a positive pressure created inside the crank chamber when the piston 113 moves toward the bottom dead center, so that the communication passage 159 is allowed to communicate with the crank chamber. Therefore, when the reed valve 160 is opened to allow the communication passage 159 to be in communication with the crank chamber, the oil mist and oil in the crank chamber 105a is delivered to the oil reservoir 107 through the communication passage 159.

The communication passage 159 has an opening end 159b being opened at substantially the center of the oil reservoir 107. Irrespective of the tilted state of the oil reservoir 107, the opening end 159b is located at a position above the surface of the oil A that is stored in the oil reservoir 107 in an amount equal to or less than the rated amount.

An opening end 151a of the supply passage 151 is opened at substantially the center of the inner space of the oil reservoir 107. Irrespective of the tilted state of the oil reservoir 107, the opening end 151a never stays below the surface of the oil stored in the oil reservoir 107 in an amount equal to or less than the rated amount, even when the position of the oil surface is changed. Moreover, the opening end 151a is disposed such that the opening end 159b protrudes further than the opening end 151a.

As described above, the opening end 159b of the communication passage 159 and the opening end 151a of the supply passage 151 are disposed in the oil reservoir 107 such that the opening end 159b protrudes further than the opening end 151a. Therefore, the oil mist ejected from the opening end 159b of the communication passage 159 does not directly enter the opening end 151a of the supply passage 151. Preferably, the communication passage 159 and the supply passage 151 may be disposed so as to be spaced apart from each other toward the respective opening ends.

A liquefying unit 140 for liquefying the oil mist ejected from the opening end 159b is disposed near the opening end 159b of the communication passage 159. The liquefying unit 140 includes: a collision plate 141 for liquefying oil mist that is ejected from the opening end 159b and adheres to the collision plate 141 for liquefying; and a protruding portion 141a that is provided on the end of the collision plate 141 on the supply passage side and protrudes toward the rear side of the communication passage 159 in its extending direction. The protruding portion 141a blocks the space between the opening end 159b and the opening end 151a.

In this configuration, the oil mist ejected from the opening end 159b of the communication passage 159 collides with the collision plate 141 and is liquefied, and the liquefied oil is discharged from the edge of the collision plate 141 and is returned to the oil stored in the oil reservoir 107. The oil mist ejected from the opening end 159b and remaining unliquefied is blocked by the protruding portion 141a, so that substantially no oil mist directly enters the opening end 151a of the supply passage 151.

Therefore, most of the oil mist ejected from the communication passage 159 is liquefied. The concentration of the oil mist that stays in the oil reservoir 107 can thereby be reduced, and the concentration of the oil mist supplied to the supply passage 151 can be reduced.

An opening end 151b of the supply passage 151 is opened in the valve-operating chamber 130 so as to be in communication with the valve-operating chamber 130 on its cylinder block 103 side. Therefore, the oil mist flowing through the supply passage 151 lubricates the valve-operating mechanism 120 in the valve-driving chamber 152. The oil mist is then ejected from the opening end 151b and supplied to the valve-operating chamber 130, so as to lubricate the rocker arms and other components in the valve-operating chamber 130.

A plurality of suction tubes 146 are provided in the valve-operating chamber 130 to suck the oil accumulated in the valve-operating chamber 130. The suction tubes 146 are connected to a connection passage 145. The suction passage 145 is disposed in the valve-operating chamber 130 so as to be located on the side opposite to the crank chamber 105a. The suction tubes 146 are in communication with the connection passage 145 and extend into the valve-operating chamber 130 toward the crank chamber, and each of the suction tubes 146 has an opening end. The opening ends of the suction tubes 146 are disposed near the bottom surface of the valve-operating chamber 130 on the crank chamber side in order to suck oil present on the bottom surface on the crank chamber side within the valve-operating chamber 130. The suction tubes 146 are disposed near the corners of the valve-operating chamber 130. Therefore, even when the engine 100 is tilted with the valve-operating chamber 130 located in an upper position, the oil accumulated in the valve-operating chamber 130 is sucked through any one of the suction tubes 146.

A plurality of small holes 144 are formed in the connection passage 145. These small holes 144 are disposed on the side opposite to the crank chamber 105a so as to be located near the corners of the valve-operating chamber 130. Therefore, even when the engine 100 is tilted and held upside down with the valve-operating chamber 130 located at a lower position, the oil accumulated in the valve-operating chamber 130 can be sucked through any one of the small holes 144.

A direct passage 147 is provided to the connection passage 145, and the valve-operating chamber 130 communicates with the crank chamber 105a through the direct passage 147 when a negative pressure is created in the crank chamber 105a. As in the opening end 154a of the oil feed passage 154, an opening end 147a of the direct passage 147 being opened in the crank chamber is disposed so as to establish communication with the crank chamber when the piston 113 moves from a position near the top dead center toward the top dead center. This opening end 147a is positioned on the bottom dead center side of the skirt 113a provided in the lower portion of the piston when the piston is moved to the position near the top dead center. Therefore, the opening end 147a of the direct passage 147 is already in a fully open state when the piston 113 reaches the top dead center.

The opening end 147a of the direct passage 147 is positioned so as to be in communication with the crank chamber after the opening end 154a of the oil feed passage 154 on the crank chamber side establishes communication with the crank chamber. When the opening end 154a of the oil feed passage 154 is in a fully open state shown in FIG. 6, the opening end 147a of the direct passage 147 is closed. Therefore, the negative pressure created in the crank chamber is applied to the oil feed passage 154 but is not applied to the direct passage 147, and accordingly, a sufficient amount of oil can be first supplied to the crank chamber 105a. When the opening end 147a is then opened, a sufficient amount of air can also be supplied.

A one-way valve 148 that allows a flow from the valve-operating chamber 130 toward the crank chamber 105a but prevents a flow from the crank chamber 105a toward the valve-operating chamber 130 may be provided in the direct passage 147. In this manner, the back flow of oil and oil mist from the crank chamber 105a to the valve-operating chamber 130 can be reliably prevented.

The one end of a breather passage 136 is opened at substantially the center of the valve-operating chamber 130, and the other end of the breather passage 136 is connected to an air cleaner 163. The breather passage 136 is provided to discharge blow-by gas into a combustion chamber. The oil mist and blow-by gas in the valve-operating chamber 130 are delivered to the air cleaner 163 through the breather passage 136, and the oil and the blow-by gas are separated by an oil separator 163a provided in the air cleaner 163. As described above, the breather passage 136 at its one end is opened at substantially the center of the valve-operating chamber 130. Therefore, even when a large amount of oil stays in the valve-operating chamber 130, the oil is not easily sucked. A one-way valve 136b is provided in the breather passage 136, and the backflow of blow-by gas and oil mist from the air cleaner 163 toward the valve-operating chamber 130 is prevented by the one-way valve 136b.

The liquid oil separated from the gas component is delivered to the crank chamber 105a through a circulation passage 165 that communicates the air cleaner 163 with the crank chamber 105a. A one-way valve 165a that allows only a flow toward the crank chamber is disposed in the circulation passage 165. The blow-by gas separated from the liquid component is delivered to the combustion chamber together with intake air.

A return passage 166 for returning the oil in the valve-driving chamber 152 to the crank chamber 105a is provided between the direct passage 147 and the bottom portion of the valve-driving chamber 152 on the oil reservoir side. The return passage 166 and the direct passage 147 are connected at a position between the one-way valve 148 and the valve-operating chamber 130. When a negative pressure is created in the crank chamber 105a, the oil accumulated in the valve-driving chamber 152 is sucked through the return passage 166. Since the return passage 166 is connected to the crank chamber 105a through the one-way valve 148, substantially no oil flows back from the crank chamber 105a to the valve-driving chamber 152.

By providing the return passage 166 and the direct passage 147 so as to communicate with each other, the oil is not supplied more than necessary from the supply passage 151 to the valve-operating chamber 130.

A flow rate control passage 167 is provided between the valve driving chamber 152 and the oil feed passage 154. The air in the valve driving chamber 152 is sucked into the flow rate control passage 167, and the flow rate of oil supplied to the crank chamber 105a through the oil feed passage 154 is thereby controlled. When the amount of sucked air is large, the flow rate of oil supplied through the oil feed passage 154 is low. Preferably, the flow rate control passage 167 is disposed so as to be spaced apart from the bottom portion of the valve driving chamber 152 so that the oil staying in the valve driving chamber 152 is less likely to be sucked. In this configuration, the flow rate control passage 167 is connected to the valve-driving chamber 152 on the valve-operating chamber 130 side of the return passage 166, and therefore the oil is not sucked through the flow rate control passage 167.

The flow rate control passage 167 is connected to the oil feed passage 154 at a position that is closer to the oil reservoir than the one-way valve 157 provided in the oil feed passage 154. Therefore, when the supply of oil is stopped by the one-way valve 157, the oil in the oil feed passage 154 is accumulated on the oil reservoir side of the one-way valve 157, and the oil is accumulated in the connection portion of the flow rate control passage 167 to the oil feed passage 154. Therefore, when air is sucked from the flow rate control passage 167 into the oil feed passage 154, only the air does not flow through the oil feed passage 154, but the oil in the oil feed passage 154 is delivered to the crank chamber 105a together with the air delivered from the valve driving chamber 152.

A flow restrictor 168 for controlling the flow rate of air delivered from the valve driving chamber 152 to the oil feed passage 154 is provided in the flow rate control passage 167. By controlling the flow restrictor 168 to adjust the amount of air sucked from the valve driving chamber 152, the flow rate of oil supplied to the crank chamber 105a through the oil feed passage 154 can be controlled. More specifically, the flow rate of oil can be easily controlled only by the design of the flow restrictor 168, irrespective of the inner diameter of the flow rate control passage 167.

The flow restrictor 168 may not be provided separately from the flow rate control passage 167 and may be provided as a part of the flow rate control passage 167. For example, if a part of the flow rate control passage 167 is formed along the sealing surface between the cylinder block 103 and the crank case 105 and is connected to the oil feed passage 154 at a position on the sealing surface, the flow restrictor 168 can be easily formed.

More specifically, the circulation path of the lubrication system includes the oil feed passage 154, the communication passage 159, the supply passage 151, the suction tubes 146, the small holes 144, the connection passage 145, the direct passage 147, the breather passage 136, the circulation passage 165, the return passage 166, and the flow rate control passage 167.

When the engine 100 is started, pressure changes occur in the crank chamber 105a due to the upward and downward movement of the piston 113. When the piston 113 moves upward, the pressure inside the crank chamber 105a is reduced, so that a negative pressure tends to be created. When the piston 113 moves downward, the pressure inside the crank chamber 105a is increased, so that a positive pressure tends to be created.

As the piston 113 moves to the vicinity of the top dead center, a negative pressure tends to be created in the crank chamber 105a, and communication between the opening end 154a of the oil feed passage 154 and the crank chamber 105a is established. Then the crank chamber 105a communicates with the oil reservoir 107, and the negative pressure created in the crank chamber 105a is applied to the oil feed passage 154. Even when the engine 100 is tilted, the suction part 155 of the oil feed passage 154 stays below the surface of the oil A in the oil reservoir 107, and the oil A is sucked from the oil reservoir 107 and is delivered to the crank chamber 105a. Since the opening end 147a of the direct passage 147 is still closed when the opening end 154a is already in a fully open state (see FIG. 6), the negative pressure in the crank chamber 105a can be sufficiently applied to the oil feed passage 154. Therefore, the oil A sucked from a position below the oil surface can be sufficiently supplied to the crank chamber 105a.

The oil delivered to the crank chamber 105a lubricates the driving components such as the piston 113 and a crankshaft and is simultaneously scattered by the driving components to form oil mist. Part of the oil mist adheres to the wall surfaces of the crank chamber 105a and is re-liquefied.

When the piston 113 further moves from the position near the top dead center toward the top dead center as shown in FIG. 5, the opening end 147a of the direct passage 147 also establishes communication with the crank chamber 105a, and the negative pressure inside the crank chamber 105a can be applied to the direct passage 147. A sufficient amount of air is thereby supplied to the crank chamber 105a through the direct passage 147 to generate oil mist. Even when a large amount of oil is accumulated in the valve-operating chamber 130, the oil can be returned to the crank chamber 105a.

When the piston 113 moves downward from the top dead center, a positive pressure is created in the crank chamber 105a instead, and the reed valve 160 is opened to communicate the crank chamber 105a with the oil reservoir 107. Then, the oil mist and oil increased in pressure in the crank chamber 105a are delivered to the oil reservoir 107 through the communication passage 159, and the pressure inside the oil reservoir 107 is increased. The oil mist ejected from the communication passage 159 is liquefied by the liquefying unit 140, and the resulting oil is stored in the oil reservoir 107. The concentration of the remaining oil mist within the oil reservoir 107 is lower than the concentration of oil mist in the crank chamber 105a. When a positive pressure is created in the crank chamber 105a, the direct passage 147 and the oil feed passage 154 are blocked by the action of the one-way valves 147a and 157 so that oil is prevented from flowing back from the crank chamber 105a to the valve-operating chamber 130 and the oil reservoir 107, respectively, and then the opening ends 147a and 154a are closed by the piston 113.

When the pressure inside the oil reservoir 107 is increased, a pressure gradient is generated between the oil reservoir 107 and the valve-operating chamber 130. The oil mist accumulated in the oil reservoir 107 is delivered to the valve-operating chamber 130 through the supply passage 151. In the process of delivering the oil mist from the oil reservoir 107 to the valve-operating chamber 130, the components included in the valve-operating mechanism 120 in the valve-driving chamber 152 provided in the supply passage 151 are lubricated. During this process, part of the oil mist is liquefied.

The oil liquefied in the valve-driving chamber 152 can be delivered to the crank chamber 105a through the return passage 166 and the direct passage 147. Therefore, excessive accumulation of oil in the valve-driving chamber 152 can be prevented, and the flow of oil to the valve-operating chamber 130 can thereby be prevented. In addition, clogging of the supply passage 151 with oil can be prevented.

The oil mist supplied to the valve-operating chamber 130 lubricates the valve-operating mechanism provided in the valve-operating chamber 130 and is delivered to the crank chamber 105a through the direct passage 147. Even when the oil mist supplied to the valve-operating chamber 130 is liquefied and stays therein, a strong negative pressure in the crank chamber 105a is applied to the liquefied oil, and therefore the oil can be delivered to the crank chamber 105a, so that the oil is prevented from staying in the valve-operating chamber 130.

Therefore, the oil is prevented from being emitted together with blow-by gas discharged from the valve-operating chamber 130 through the breather passage 136.

As described above, the lubrication system for the four-stroke engine 100 of the present invention includes the oil feed passage 154 including the suction part 155b. Even when the oil reservoir 107 is tilted with the oil A stored therein in an amount within a rated range and the position of the surface of the oil A is thereby changed, the suction part 155b stays below the surface of the oil. Therefore, the oil in the oil reservoir 107 can be sucked through the suction part 155b and be delivered to the crank camber 105. The oil feed passage 154 has the opening end 154a that is opened in the crank chamber, and the opening end 154a is positioned so as to establish communication with the crank chamber 105a when the piston 113 moves from a position near the top dead center toward the top dead center. In this configuration, even when the oil reservoir 107 is tilted, the oil A sucked from the oil reservoir 107 through the oil feed passage 154 can be sufficiently delivered to the crank chamber 105a, and lubrication failure can be prevented from occurring in the crankshaft and components therearound The lubrication system includes the direct passage 147 having a plurality of openings that are spaced apart from each other, are opened in the valve-operating chamber 130 at one ends and are opened in the crank chamber 105a at the other ends, so as to communicate the valve-operating chamber 130 with the crank chamber 105a when a negative pressure is created in the crank chamber 105a. The opening end 147a of the direct passage 147 that is opened in the crank chamber 105a is positioned so as to establish communication with the crank chamber 105a when the piston 113 moves from a position near the top dead center toward the top dead center. In this configuration, when the piston 113 moves from the position near the top dead center toward the top dead center, the negative pressure inside the crank chamber 105a can be effectively applied to the direct passage 147. Therefore, the oil accumulated in the valve-operating chamber 130 can be reliably sucked and is returned to the crank chamber 105a, and the accumulation of oil in the valve-operating chamber 130 can be suppressed.

The invention claimed is:

1. A lubrication system for a four-stroke engine configured to lubricate components in a crank chamber and in a valve-operating chamber with oil by supplying the oil by utilizing changes in pressure inside the crank chamber caused by reciprocating movement of a piston while circulating the oil, the oil being stored in an oil reservoir provided separately from the crank chamber, the valve-operating chamber accommodating intake and exhaust valve mechanisms therein and configured to discharge blow-by gas in an oil circulation path from the valve-operating chamber to a combustion chamber characterized by:
- an oil feeding passage for communicating the oil reservoir with the crank chamber to deliver the oil stored in a liquid form in the oil reservoir to the crank chamber when a negative pressure is created in the crank chamber;
- a communication passage for communicating the crank chamber with the oil reservoir to deliver oil mist generated in the crank chamber to the oil reservoir when a positive pressure is created in the crank chamber;
- liquefying means provided in the oil reservoir for liquefying the oil mist delivered from the communication passage to the oil reservoir to decrease a concentration of the oil mist,
- the liquefying means including (i) a tubular punched metal plate disposed around the opening end of the communication passage, and (ii) a collision plate disposed at a bottom portion of the tubular punched metal plate so as to be located on the front side of the opening end in a protruding direction of the communication passage; and
- a supply passage for supplying the oil mist from the oil reservoir to the valve-operating chamber through the liquefying means, the supply passage being provided separately from the oil feeding passage.

2. The lubrication system for the four-stroke engine according to claim 1, wherein
- the communication passage and the supply passage have respective opening ends opened at substantially a center of the oil reservoir and protrude into the oil reservoir, and the liquefying means is configured such that the opening end of the communication passage protrudes further than the opening end of the supply passage, and that the opening end of the communication passage and the opening end of the supply passage are disposed such that the respective opening ends of the communication passage and the supply passage never stay below a surface of the oil even when the oil reservoir with a rated amount or less of the oil stored therein is tilted and a position of the surface of the oil is thereby changed.

3. The lubrication system for the four-stroke engine according to claim 1, wherein
- the liquefying means is disposed around the opening end of the communication passage and includes:
- a collision part with which the oil mist delivered from the communication passage is allowed to collide to facilitate liquefaction of the oil mist; and a discharge part for discharging the oil and oil mist.

4. The lubrication system for the four-stroke engine according to claim 1, wherein
- the communication passage and the supply passage have respective opening ends opened at substantially a center of the oil reservoir;
- the liquefying means is configured such that the opening end of the communication passage and the opening end of the supply passage are disposed such that the respective opening ends of the communication passage and the supply passage never stay below a surface of the oil even when the oil reservoir with a rated amount or less of the oil stored therein is tilted and a position of the surface of the oil is thereby changed, and that a flow blocking unit for preventing the oil and oil mist delivered from the communication passage from directly flowing into the supply passage is disposed between the opening end of the communication passage and the opening end of the supply passage.

5. The lubrication system for the four-stroke engine according to claim 1, wherein
- a valve-driving chamber for accommodating driving components of the valve mechanisms is provided in the supply passage; and
- a return passage for returning the oil in the valve driving chamber to the crank chamber is provided between the crank chamber and a bottom portion of the valve driving chamber on the oil reservoir side.

6. The lubrication system for the four-stroke engine according to claim 1, further comprising:
- a direct passage that communicates the valve-operating chamber with the crank chamber when a negative pressure is created in the crank chamber.

7. The lubrication system for the four-stroke engine according to claim 6, wherein
- the direct passage has an opening end that is opened in the crank chamber, the opening end being disposed at a position so as to establish communication with the crank chamber when the piston moves from a position near a top dead center toward the top dead center.

8. A lubrication system for a four-stroke engine configured to lubricate components in a crank chamber and in a valve-operating chamber with oil by supplying the oil by utilizing changes in pressure inside the crank chamber caused by reciprocating movement of a piston while circulating the oil, the oil being stored in an oil reservoir provided separately from the crank chamber, the valve-operating chamber accommodating intake and exhaust valve mechanisms therein and configured to discharge blow-by gas in an oil circulation path from the valve-operating chamber to a combustion chamber, comprising:
- an oil feed passage including a suction part, the suction part being positioned so as to stay below a surface of the oil even when the oil reservoir is tilted with the oil stored therein in an amount within a rated range and a position of the surface of the oil is thereby changed, the oil feed passage is configured such that, when a negative pressure is created in the crank chamber, the oil reservoir and the crank chamber are in communication with each other through the oil feed passage so that the oil in the oil reservoir is sucked through the suction part and is delivered to the crank chamber,
- wherein the oil feed passage has an opening end opened in the crank chamber, the opening end being positioned so as to establish communication with the crank chamber when the piston moves from a position near a top dead center toward the top dead center; and
- a direct passage having a plurality of openings that are spaced apart from each other, are opened in the valve-operating chamber in one side and having an opening that is opened in the crank chamber in the other side, so as to communicate the valve-operating chamber with the crank chamber when a negative pressure is created in the crank chamber,
- wherein the opening end of the direct passage opened in the crank chamber is positioned so as to establish communication with the crank chamber when the piston moves from a position near the top dead center toward the top dead center; and
- wherein the oil in the valve-operating chamber is delivered to the crank chamber through the direct passage when a negative pressure is created in the crank chamber; and a liquefying means that includes (i) a tubular punched metal plate disposed around the opening end of a communication passage, and (ii) a collision plate disposed at a bottom portion of the tubular punched metal plate so as to be located on the front side of the opening end in a protruding direction of the communication passage.

9. The lubrication system for the four-stroke engine according to claim 8, further comprising:

the communication passage that, when a positive pressure is created in the crank chamber, communicates the crank chamber with the oil reservoir to deliver oil mist generated in the crank chamber to the oil reservoir;

a supply passage for supplying the oil mist from the oil reservoir to the valve-operating chamber;

a valve-driving chamber for accommodating driving components of the valve mechanisms, the valve-driving chamber being disposed in the supply passage; and a return passage for returning the oil in the valve-driving chamber to the crank chamber, the return passage being disposed between a bottom portion of the valve-driving chamber on the oil reservoir side and the direct passage.

10. The lubrication system for the four-stroke engine according to claim 8 wherein the opening end of the oil feed passage that is opened in the crank chamber is disposed at a position so as to be opened before the communication of the opening end of the direct passage on the crank chamber side with the crank chamber is established.

\* \* \* \* \*